United States Patent
Griffin et al.

(10) Patent No.: US 8,467,838 B2
(45) Date of Patent: Jun. 18, 2013

(54) PORTABLE ELECTRONIC DEVICE

(75) Inventors: Jason Tyler Griffin, Waterloo (CA); Martin Riddiford, Dulwich (GB)

(73) Assignee: Research In Motion Limited, Waterloo (CA)

( * ) Notice: Subject to any disclaimer, the term of this patent is extended or adjusted under 35 U.S.C. 154(b) by 573 days.

(21) Appl. No.: 12/623,131

(22) Filed: Nov. 20, 2009

(65) Prior Publication Data
US 2011/0122553 A1 May 26, 2011

(51) Int. Cl.
*H04M 1/00* (2006.01)
(52) U.S. Cl.
USPC .......... 455/575.3; 455/575.1; 455/575.2; 455/575.4; 455/575.5; 455/575.6; 455/575.7; 455/575.8; 455/575.9
(58) Field of Classification Search
USPC .......... 455/575.1, 575.2, 575.3, 575.4, 575.5, 455/575.6, 575.7, 575.8, 575.9
See application file for complete search history.

(56) References Cited

U.S. PATENT DOCUMENTS

| | | |
|---|---|---|
| 5,532,904 A | 7/1996 | Sellers |
| 5,729,480 A | 3/1998 | Katoh et al. |
| 5,754,395 A | 5/1998 | Hsu et al. |
| 5,768,094 A | 6/1998 | Merkel |
| 6,019,530 A | 2/2000 | Lanzetta et al. |
| 6,377,827 B1 * | 4/2002 | Rydbeck ............ 455/575.3 |
| 6,773,178 B2 | 8/2004 | Miyako et al. |
| 7,527,449 B2 | 5/2009 | Petrie et al. |
| 7,599,721 B2 | 10/2009 | Taki et al. |
| 8,115,327 B2 * | 2/2012 | Yomoda et al. ............ 290/1 E |
| 8,159,834 B2 * | 4/2012 | Griffin et al. ............ 361/810 |
| 2001/0009847 A1 * | 7/2001 | Kim et al. ............ 455/90 |
| 2002/0142736 A1 * | 10/2002 | Shin ............ 455/90 |
| 2003/0050019 A1 | 3/2003 | Dowling et al. |
| 2006/0111161 A1 | 5/2006 | Cha et al. |
| 2006/0164799 A1 | 7/2006 | Varela |
| 2008/0280658 A1 | 11/2008 | Clemens |

FOREIGN PATENT DOCUMENTS

| | | |
|---|---|---|
| EP | 1542435 A1 | 6/2005 |
| EP | 1569421 | 8/2005 |
| EP | 1879364 A1 | 1/2008 |
| EP | 1950940 A1 | 7/2008 |

OTHER PUBLICATIONS https://www.samstores.com/details.asp?ProdID=6375.
https://www.samstores.com/Store.asp?Search=13121.
https://www.samstores.com/Store.asp?Search=4861.
https://www.samstores.com/Store.asp?Search=2774.
https://www.samstores.com/Store.asp?Search=11863&x=12&y=2.

(Continued)

*Primary Examiner* — Kamran Afshar
*Assistant Examiner* — Shahriar Behnamian
(74) *Attorney, Agent, or Firm* — Novak Druce Connolly Bove + Quigg LLP

(57) ABSTRACT

A portable electronic device comprises a base and a cover rotatably mounted to the base. A lever arrangement comprising a co-operating lever arm and a support is defined by the base and the cover. The cover is movable between a closed position and an open position through an over center position by movement of the lever against the support upon rotation of the cover. The cover may be biased toward the closed position when the cover is on a closed side of the over center position and toward the open position when the cover is on an open side of the over center position.

20 Claims, 7 Drawing Sheets

OTHER PUBLICATIONS http://mb.softbank.jp/en/products/sharp/922sh.html.
http://egadgetdepot.com/catalog/product_info.php?products_id=77&osCsid=a46e650d991fe627b4725c5335393913.

Canadian Examiner's Report mailed on Jul. 12, 2012, in corresponding Canadian patent application No. 2,721,208.

* cited by examiner

PORTABLE ELECTRONIC DEVICE

FIELD

This application relates to portable electronic devices which can be folded for storage and transportation such as flip type cellular telephones and laptop computers.

BACKGROUND

Portable electronic devices that can be folded normally consist of a top or cover portion and a bottom or base portion. The cover portion and the base portion may be connected by a hinge. Typically, the inside of the cover portion contains a display, such as a screen, and the inside of the base portion contains a keyboard or other user interface. When folded or closed, the display and user interface are inside and protected. When unfolded or opened, the display and user interface face outward and are accessible for use.

BRIEF DESCRIPTION OF THE DRAWINGS

The embodiments will now be described in greater detail with reference to the accompanying diagrams, in which.

DETAILED DESCRIPTION OF THE PREFERRED EMBODIMENTS

Figure 1:
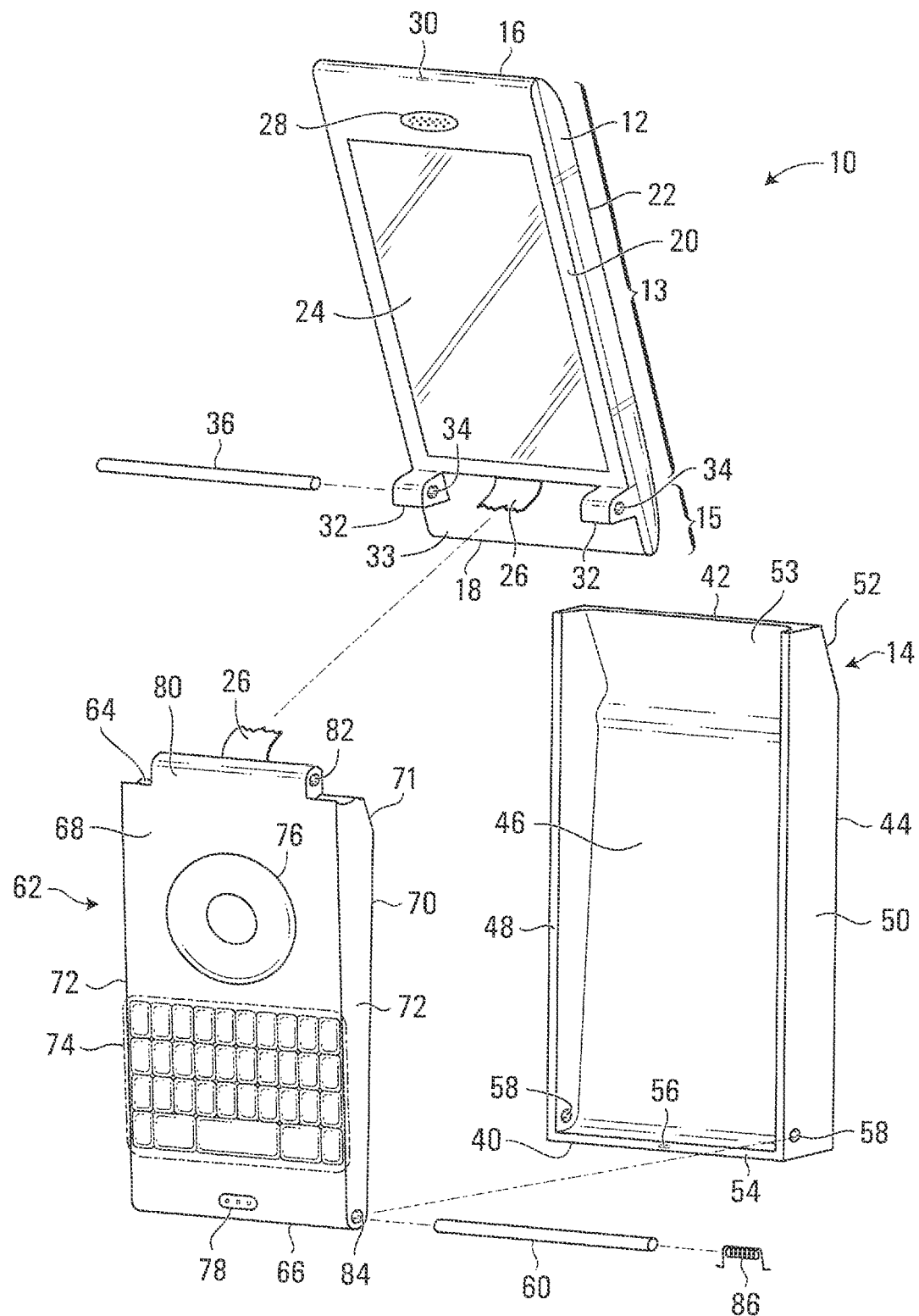
FIG. 1 is an exploded perspective view of a cellular telephone according to a first embodiment in an open position.

According to a broad aspect, a portable electronic device comprises: a base; a cover rotatably mounted to the base; and a lever arrangement comprising a co-operating lever arm and a support defined by the base and the cover; wherein the cover is movable between a closed position and an open position through an over center position by movement of the lever arm against the support upon rotation of the cover.

In some embodiments, the cover is biased by a spring mechanism toward the closed position when the cover is on a closed side of the over center position and toward the open position when the cover is on an open side of the over center position.

In some embodiments the device further comprises an input device assembly and the cover is rotatably mounted to the input device assembly.

In some embodiments the cover is rotatably mounted to the input device assembly by at least one first hinge.

In some embodiments the input device assembly is movable between a raised position when the cover is in the open position and a lowered position when the cover is in the closed position.

In some embodiments the input device assembly is rotatably mounted to the base and movement of the lever against the support upon opening the cover raises the user interface relative to the base.

In some embodiments the input device assembly is mounted to the base by a second hinge, and a spring mechanism acts on the hinge to bias the input device assembly to the lowered position.

In some embodiments the spring acts to bias the cover towards the open or the closed position.

In some embodiments the cover is mounted to the base by a hinge, and a spring mechanism, remote from the hinge, biases the cover towards the open or the closed position.

In some embodiments the cover is rotatable about a hinge spaced inward from a contact end of the cover and the lever arm comprises the portion of the cover between the hinge and the end of the cover.

In some embodiments the cover supports the input device assembly in the raised position.

In some embodiments there is a cavity between the base and the input device assembly in the raised position and a speaker opening in the cavity.

In some embodiments there is a closure at a free end of the cover for providing a closure force between the free end and the base.

In some embodiments the closure is magnetic.

In some embodiments the cover is biased toward the closed position substantially through the range of motion of the cover from the over center position to the closed position.

In some embodiments the cover is biased toward the closed position through a portion of the range of motion of the cover from the over center position to the closed position.

According to another broad aspect, a portable electronic device comprises: a base including an input device assembly mounted therein; a cover rotatably mounted to the input device assembly; a hinge configured for mounting the cover to the input device assembly, the hinge including at least one first hinge arm being spaced inward from a contact end of the cover, at least one second hinge arm extending from a cover end of the input device assembly, and a hinge pin configured for connecting said at least one first hinge arm to said at least one second hinge arm; and a lever arrangement comprising a co-operating lever arm and a support defined by the base and the cover; wherein the cover is movable between a closed position and an open position through an over center position by movement of the lever arm against the support upon rotation of the cover.

In some embodiments the portable electronic device further comprises an electrical conductor connected between the cover and the base and the electrical conductor is located between the hinge and the contact end.

According to another broad aspect, a portable electronic device comprises: a base; a cover having a free end and a contact end; a hinge rotatably mounting the cover to the base; wherein the hinge is spaced inward from the contact end; and wherein at least a portion of the cover between the hinge and the contact end fits within the base when the cover is in an open position, whereby the length of the device in the open position is shorter than the combined length of the cover and the base.

In some embodiments the portion of the cover between the hinge and the end functions as a lever arm and the hinge acts as a fulcrum to move the cover between a closed position and the open position through an over center position by movement of the lever arm against the base upon rotation of the cover.

Other aspects and features of the present application will become apparent, to those ordinarily skilled in the art, upon review of the following description of the specific embodiments.

FIGS. 1 to 7 illustrate a cellular telephone or other portable electronic device 10 according to a first embodiment. Referring first to FIG. 1, the cellular telephone 10 is a flip type cellular telephone which includes a cover 12 and a base 14.

The cover 12 of this embodiment includes a free end 16 and an opposite contact end 18. The cover 12 also includes an inside face 20 and an outside face 22. The inside face 20 and the outside face 22 of this embodiment are generally parallel. The outside face 22 tapers towards the inside face 20 at the free end 16 and at the contact end 18. Other, for example, rounded shapes are possible.

The inside face 20 of this embodiment incorporates a centrally located display screen 24 inset into the cover 12. The display screen may be eliminated or present on the base.

The cover 12 may also include a speaker 28 adjacent to the free end 16 for broadcasting incoming telephone calls. The speaker may be located elsewhere as discussed below, or eliminated if the device is a portable electronic device other than a cellular telephone.

Also adjacent to the free end 16 of this embodiment is a first part of a latching system 30. For example, the first part of the latching system 30 may comprise a magnet, a mechanical latch hook or a hole for a latch hook. The latching system may also be omitted.

In this embodiment, a pair of first hinge arms 32 project away from the inside face 20. Although other locations may be suitable, the pair of first hinge arms 32 of this embodiment are positioned at opposite sides of the inside face 20 between the display screen 24 and the contact end 18. A short portion 33 of the inside face 20 of the cover 12 extends between the pair of first hinge arms 32 and the contact end 18. In this embodiment, the pair of first hinge arms 32 have a curved shape but it will be understood that no particular shape of the pair of first hinge arms 32 is required and the shape and number of the first pair of hinge arms 32 may vary depending on the configuration of the cellular telephone 10. For example, there may be a single hinge arm rather than two hinge arms.

In this embodiment, first holes 34 are defined through each of the pair of first hinge arms 32. The first holes 34 are laterally aligned and parallel to the contact end 18, although it is appreciated that alternate orientations may be appropriate. The first holes 34 may extend all the way through the pair of first hinge arms 32 or may extend only partly through the pair of first hinge arms 32, depending on the type of hinge used. In this embodiment, the first holes 34 are sized and positioned to receive a first hinge pin or fulcrum 36 therethrough. The first hinge pin 36 is adapted to be retained in the first holes 34 when assembled in a known manner. Other types of rotatable connections may also be used as known by those of ordinary skill in the art, and accordingly will not be described in further detail herein.

The cover 12 may be conceptually divided into an effort arm 13 between the free end 16 and the first holes 34 and a load arm 15 between the first holes 34 and the contact end 18.

A ribbon cable or other conductor 26 may be provided to electrically connect the electronics housed in the cover 12 to the electronics housed in the base 14. In this embodiment, the conductor 26 extends from the inside face 20 of the cover 12 below the display screen 24, between the pair of first hinge arms 32 and in front of the portion 33 of the inside face 20. The conductor 26 may be off centered or extend out further down towards the contact end 18. Only a portion of the conductor 26 is shown with the cover 12 as the location of the remainder of the electrical cable will be described further below. Other embodiments may locate the conductor elsewhere, for example through the hinge or along the outside face 22. It is contemplated that the placement of the conductor 26 in this embodiment reduces hinge size by not running the conductor 26 through the hinge while still having the conductor 26 protected by running the conductor 26 inside the cellular telephone 10. The conductor 26 may also be replaced with other types of conductors.

The base 14, similar to the cover 12, includes a free end 40 and a contact end 42. The base 14 also has an outside face 44 and an inside face 46. In this embodiment, side walls 48 and 50 extend along the sides of the base 14 and project from the outside face 44 along the sides of the inside face 46. The side walls 48 and 50 act as a cosmetic cover to minimise gaps between components as the cover 12 moves from a closed position to an open position and vice versa. However, it will be understood that the side walls 48 and 50 are not required, and may be of other shapes or eliminated with the exception of providing support for a further hinge, if present, as discussed below.

In this embodiment, the outside face 44 is planar with the exception that it includes an angled external surface 52 adjacent to the contact end 42. The angled external surface 52 is angled in an inward direction and away from the outside face 44 of the base 14. The outside face 44 can be whatever external shape is desired for the cellular phone 10.

The inside face 46 is angled outward from the free end 40 towards the contact end 42 until an angled internal surface or support 53 is reached. At that point, the inclination of the angle of the inside face 46 changes and the angled internal surface 53 is angled inward. The angled external surface 52 is a direct offset to the angled internal surface 53 to provide material thickness but of course can deviate from this to meet the desired external shape of the cellular phone 10. The shape of the base 14 may be altered as long as the cooperating relationship explained below is maintained.

The base 14 may also include an end wall 54 at the free end 40. In this embodiment, the end wall 54 extends between and connects the sidewalls 48 and 50. The end wall 54 may include a second part of the latching system 56. The second part of the latching system 56 is chosen to cooperate with the first part of the latching system 30. For example, the second part of the latching system 56 may comprise a magnet of opposite polarity to the magnet of the first part of the latching system 30. The second part of the latching system 56 may be a hole, where the first part of the latching system 30 is a hook or the second part of the latching system 56 may be a hook if the first part of the latching system 30 is a hole. The end wall and the latching system may be eliminated.

Second holes 58 are defined in the side walls 48, 50 adjacent to the end wall 54. The second holes 58 are sized and laterally aligned in order to receive a second hinge pin 60. In this embodiment, there are two second holes 58 which extend through the side walls 48, 50. However, depending on the type of hinge used, the second holes 58 may not be extended all of the way through the side walls 48, 50 and one of the second holes 58 may be eliminated. The second holes may be completely eliminated if a different type of rotatable connection is used.

In this embodiment, the cellular telephone 10 also includes an input device assembly 62. The input device assembly 62 includes a cover end 64 for connecting to the cover 12 and a base end 66 for connecting to the base 14. The input device assembly 62 further has an input side 68 and a base side 70. In this embodiment, the input side 68 and the base side 70 are planer and slightly angled away from each other from the base end 66 towards the cover end 64. A small portion 71 of the base side 70 is provided near the cover end 64 and angles inward toward the input side 68. However, other shapes of input device assemblies 62 may be provided.

Side walls 72 extend between the input side 68 and the base side 70 and between the cover end 64 and the base end 66, which together define an interior space (not shown) which may house electronics for the operation of the cellular telephone 10.

The input side 68 of the input device assembly 62 may include various forms of input devices including, for example, in this embodiment, a key pad 74 and a touch pad 76. A microphone 78, for picking up the user's speech, may be provided adjacent the base end 66 of the input device assembly 62. The input device assembly 62 may also or alternatively be provided on the cover 12. Similarly, the microphone 78 may be located elsewhere or eliminated if the device is not a cellular telephone 10.

At the cover end 64, there may be provided a second hinge arm 80. In this embodiment, the second hinge arm 80 forms an extension of the cover end 64. The second hinge arm 80 defines a third hole 82 extending laterally therethrough parallel to the cover end 64, although alternate orientations of the third hole 82 relative to the cover end 64 may be appropriate. In this embodiment, the second hinge arm 80 is sized to fit between the pair of first hinge arms 32 of the cover 12. The third hole 82 is sized and positioned to align with the first holes 34 of the cover 12 for receiving the first hinge pin 36 therethrough in the assembled state of the cellular telephone 10. As noted above, the hinge arms 32, 80 and holes 34, 82 may be varied or eliminated depending on the type of hinge or other rotatable connection used. The first hinge pin 36 and the hinge arms 32, 80 form a hinge 83(see FIGS. 4 and 5) that is spaced inward from the contact end 18.

Extending behind the second hinge arm 80 from the base side 70 of the input device assembly 62 of this embodiment is a second portion of the conductor 26. This portion of the conductor 26 completes the electrical connection between the cover 12 and the input device assembly 62 of the base 14. In this embodiment, the connector 26 is positioned such that it extends between the cover 12 and the input device assembly 62 and behind the input device assembly 62 when the cellular telephone 10 is assembled.

In this embodiment, a fourth hole 84 is defined through the input device assembly 62 adjacent to the free end 66. The fourth hole 84 extends laterally through the user interface parallel to the free end 66 and is sized to receive the second hinge pin 60. The fourth hole 84 of the input device assembly 62 is positioned to align with the second holes 58 of the base 14 when the cellular telephone 10 is assembled.

A torsion spring 86 may also be provided, and is sized to act on the input device assembly 62 and the base 14 when the input device assembly 62 is assembled to the base 14 with the second hinge pin 60 positioned through the respective holes 58, 84. The torsion spring 86 is mounted to bias the input device assembly 62 towards the base 14 in a lowered position. This results in the base side 70 of the input device assembly 62 resting against the inside face 46 of the base 14. Other spring mechanisms such as a linear spring between the base side 70 and the inside face 46 may be used.

The angles of the internal surfaces (the inside face 46 and the angled section 53) of the base 14 are driven by angles of other surfaces within the assembly such as the base side 70 of the input device assembly 62. The shape of the inside face 46 may not be functional. For example, in this embodiment the inside face 46 is a clearance offset to accommodate the base side 70 of the input device assembly 62 when the cellular phone 10 is in a closed position. In this embodiment, the shapes of the base side 70 of the input device assembly 62 and the inside face 46 of the base 14 are complimentary.

The angled section 53 corresponds to the shape of the outside face 22 of the cover 12 and is configured to provide a nesting surface for when the cellular phone 10 is in an open position. The angled internal surface 53 can also provide a cam surface for the contact end 18 of the cover 12 to engage to control the height displacement of the first hinge pin 36 when moving from the closed to the open position or vice versa as further discussed below.

The first hinge pin 36 may start in and return to the same position when the cover 12 moves from the closed position to the open position or it may not. For example, if there was a requirement to raise the input device assembly 62 for access in the open position, it would be necessary to raise the first hinge pin 36 from its closed position as discussed below. The side walls 48 and 50 would then enclose any moving components and conceal the gaps between components when the cover 12 was moving between the open and closed positions.

Figure 2:
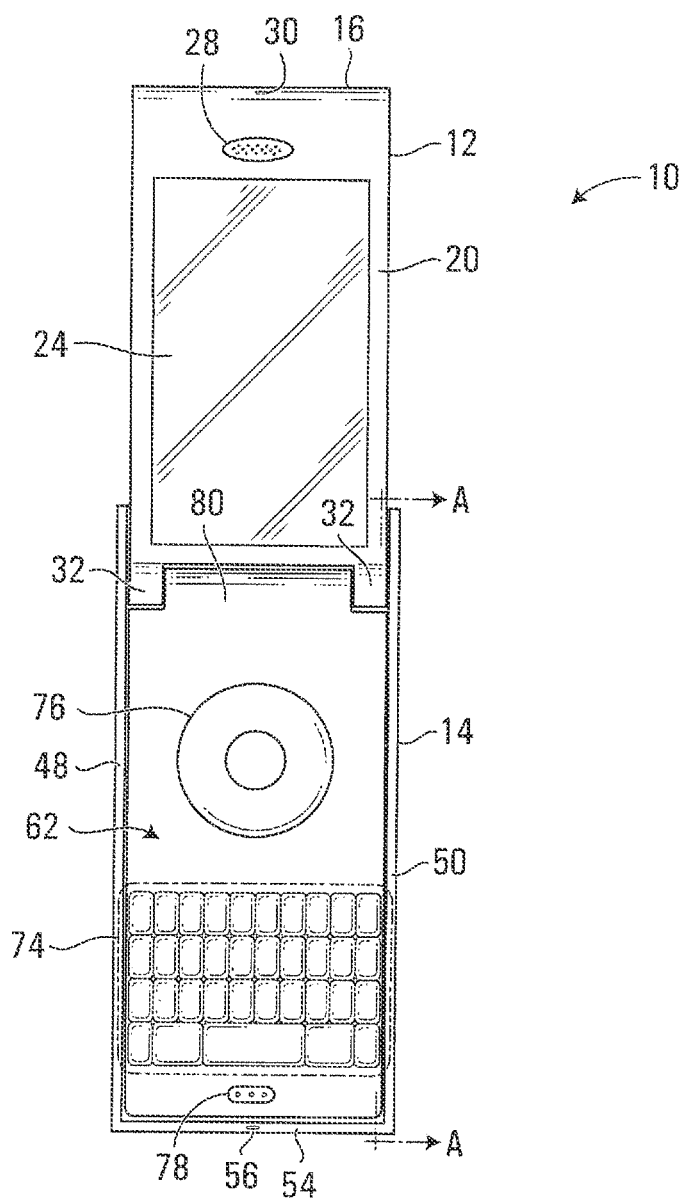
FIG. 2 is a top view of the cellular telephone of FIG. 1.

FIG. 2 shows a top view of the cellular telephone 10 of FIG. 1 in an assembled state. The same reference characters are used to indicate the same elements in FIG. 2 as are shown in FIG. 1. The cover 12 is rotatably connected to the input device assembly 62 by the first hinge pin 36 (not shown) through the holes 34, 82 (not shown) of the hinge arms 32, 80. Similarly, the input device assembly 62 is rotatably connected to the base 14 by the second hinge pin 60 (not shown) through the openings 58, 84 (not shown). Thus the input device assembly 62 is rotatably connected at both ends.

In FIG. 2, a line AA is provided to show that the side wall 50 is omitted from FIGS. 3 to 6 so that the relative movement and connections of the cover 12, base 14, and the input device assembly 62 can be shown and explained.

FIGS. 3 to 6 show the cellular telephone 10 in four different positions. The movement of the cellular telephone 10, from the closed to the open position will be described with reference to these figures.

Figure 3:
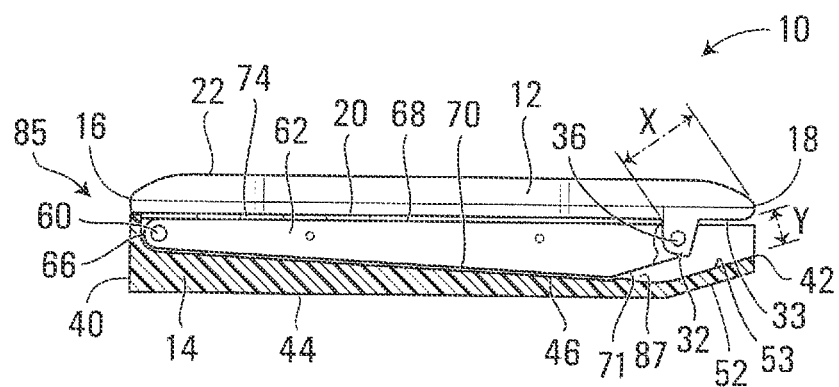
FIG. 3 is a side view of the cellular telephone of FIG. 2 in a closed position with a side of the base portion omitted along line A-A of FIG. 2.

In FIG. 3, the cellular telephone 10 is in the closed position. In this position, the outside face 22 of the cover 12 is parallel to the outside face 44 of the base 14. The inside face 20 of the cover 12 is spaced from the input side 68 of the input device assembly 62 an amount sufficient to accommodate the height of the keys of the key pad 74 above the surface of the input side 68. In this embodiment the height of the keys may be smaller than in conventional flip type telephones, in view of the fact that the input device assembly 62 is raised when open and in use and lowered when closed and not in use. In this embodiment, the free end 16 of the cover 12 rests against the end wall 54 of the base 14 to maintain the space and to connect the latching system 30, 56 (FIG. 1).

The base 14 may also include protrusions or other contours to restrict angular movement of the input device assembly 62 or restrict contact between the inside face 20 of the cover 12 with the side walls 48 & 50 of the base 14 when in the closed position.

Adjacent to the angled internal surface 53 of the base 14 a space 87 is defined between the inside face 46 of the base 14 and the small portion 71 of the base side 70 of the input device assembly 62. The space 87 also extends between the angled internal surface 53 of the base 14 and the portion 33 of the inside face 20 of the cover 12.

In this embodiment, the input device assembly 62 is rotatably connected to the base 14 by the second hinge pin 60 at the base end 66. The torsion spring 86 (not shown) acts on the input device assembly 62 and the base 14 to bias the input device assembly 62, clockwise about second hinge pin 60 as oriented in FIG. 3, to the position shown in FIG. 3.

The cover 12 is rotatably mounted to the base 14 through the hinge arms 32, 80 by the first hinge pin 36. In this embodiment, there is no bias force on the first hinge pin 36. The spring 86 is remote from the first hinge pin 36. However, in this embodiment a closure in the form of the latching system (not shown) is provided comprising the first part 30 and the second part 56 which may be aligned opposite polarity magnets at the free end 16 of the cover 12 and at the free end 40 of the base 14. The magnets cooperate to provide a slight closure force to retain the cover 12 in the closed position shown in FIG. 3.

In FIG. 3, "X" indicates a length of the portion of the cover 12 between the contact end 18 of the cover 12 and a rotational axis of the cover 12 about the first hinge pin 36. It will be appreciated that this length remains constant. "Y" indicates a shortest distance between the angled section 53 of the base 14 and the rotational axis of the cover 12 about the first hinge pin 36. It will be appreciated that this distance may change depending on the relative positions of base 14 and the input device assembly 62. It will be appreciated that the length "X" in FIG. 3 is larger than the distance "Y".

The cover 12 functions as a lever made up of the effort arm 13 and the load arm 15 which rotate about the first hinge pin 36 which acts as a fulcrum of the lever.

Figure 4:
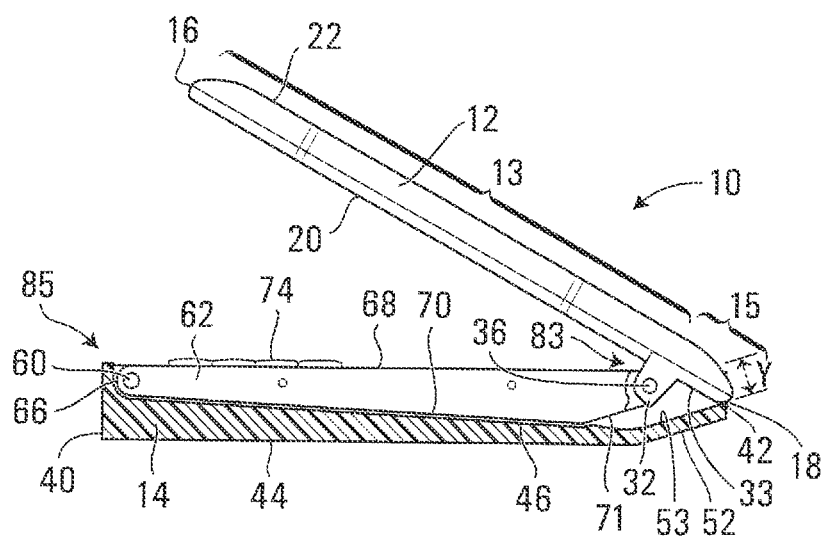
FIG. 4 is a side view of the cellular telephone of FIG. 2 in a first partially open position with a side of the base portion omitted along line A-A of FIG. 2.

When a user applies a rotational lifting force to the free end 16 of the effort arm 13 of the cover 12, the latch system 30, 56 will release and the cover 12 will freely rotate about the first hinge pin 36 to the position shown in FIG. 4.

In the position shown in FIG. 4, the input device assembly 62 is still seated in the base 14 with the base side 70 of the input device assembly 62 resting against the inside face 46 of the base 14. The input device assembly 62 is retained in this position by the biasing force of the torsion spring 86 (not shown) acting on the input device assembly 62 and the base 14 at the second hinge pin 60. In this embodiment, when the cover 12 is rotated about the first hinge pin 36 to the position shown in FIG. 4, the contact end 18 of the load arm 15 of the cover 12 comes into contact with the contact end 42 of the angled section 53 of the base 14.

Figure 5:
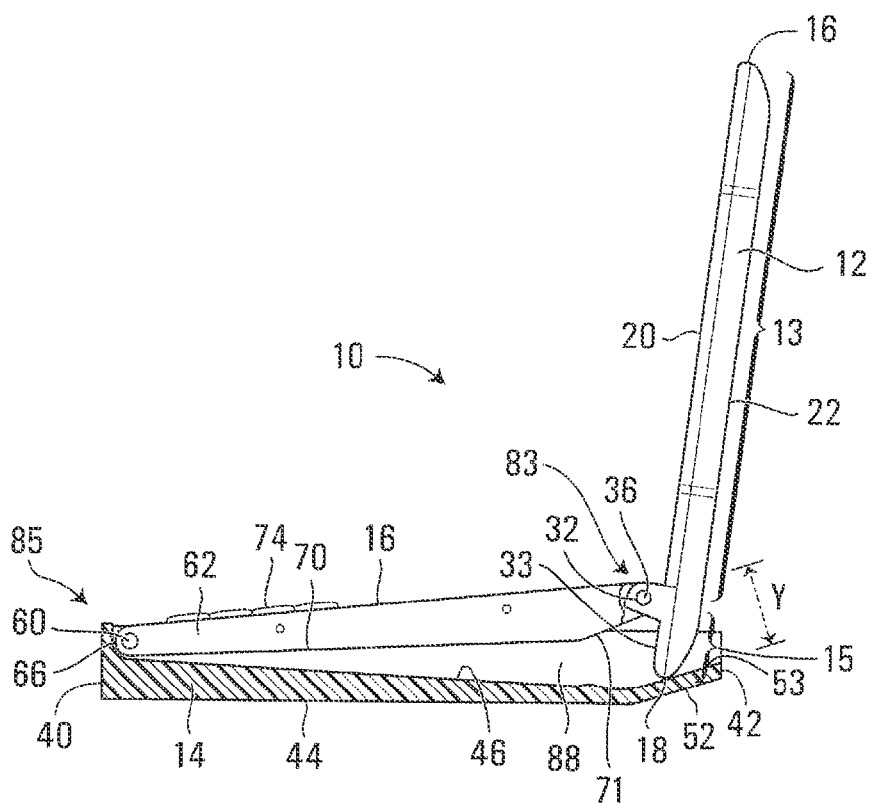
FIG. 5 is a side view of the cellular telephone of FIG. 2 in a second partially open position with a side of the base portion omitted along line A-A of FIG. 2.

The length "X" (FIG. 3) is longer than the distance "Y" in FIG. 4. Accordingly, as the cover 12 is further rotated about the first hinge pin 36, the contact end 18 slides along the angled section 53 of the base 14 into the space 87 and increases the distance "Y". The load arm 15 is levering the base side 70 of the input device assembly 62 away from the inside face 46 of the base 14 to a maximum distance "Y" as shown in FIG. 5. FIG. 5 shows an over center position in which the cover 12 is balanced between the open and closed biasing forces. An increased gap or cavity 88 is defined between the base side 70 of the input device assembly 62 and the inside face 46 of the base 14. The pressing of the contact end 18 against the angled section 53 of the base 14 as it slides up to and past the over center position acts against the biasing force of the torsion spring 86. The spring 86 biases the cover 12 toward the closed position when the cover 12 is on a closed side of the over center position and toward the open position when the cover 12 is on an open side of the over center position.

The effort arm 13 and the load arm 15 of the cover 12 act as a lever or cam with the first hinge pin 36 of the hinge 83 acting as a fulcrum around which the contact end 18 rotates. The angled internal surface 53 of the base 14 functions as a support against which the lever operates. A lever arrangement comprising a co-operating lever provided by the cover 12 and support provided by the base 14 are thus defined. In other embodiments, the lever may be provided by the base 14 and the support may be provided by the cover 12.

Figure 6:
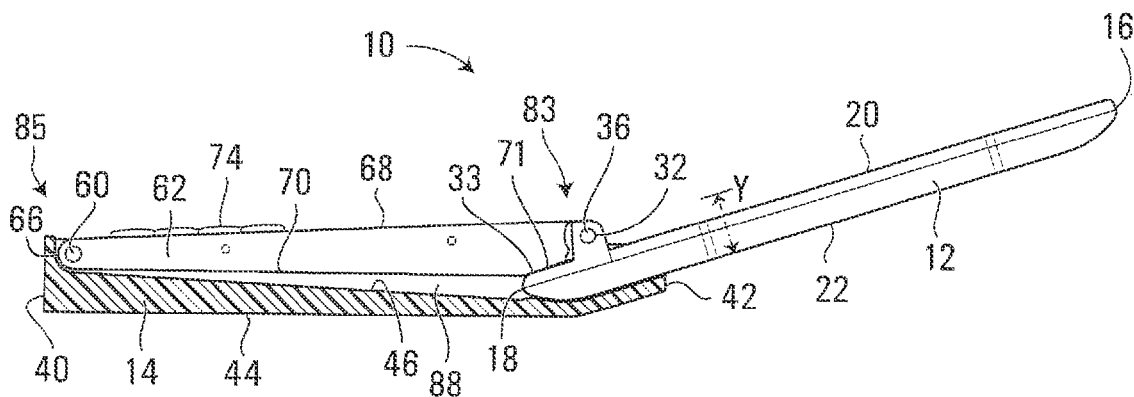
FIG. 6 is a side view of the cellular telephone of FIG. 2 in a fully open position with a side of the base portion omitted along line A-A of FIG. 2.

FIG. 6 shows the fully open position of the cellular telephone 10. In this position, the cover 12 has been rotated until the short portion 33 of the inside face 20 of the cover 12 between the pair of first hinge arms 32 and the contact end 18 rests against the small portion 71 of the base side 70 of the input device assembly 62. At the same time, a portion of the outside face 22 of the cover 12 adjacent the contact end 18 rests against the angled internal surface 53 of the base 14. The length of the cellular telephone 10 in the open position is therefore shorter than the combined length of the cover 12 and the base 14.

In the position of the cellular telephone 10 shown in FIG. 6, the gap 88 remains but is smaller than the maximum gap shown in FIG. 5. The distance "Y" is likewise smaller than that shown in FIG. 5. The cover 12 has therefore been rotated by the lever action of the contact end 18 against the angled portion 53 through the position shown in FIG. 5 to the open position shown in FIG. 6. The torsion spring 86 acts to maintain tension against the lever action throughout the range of motion shown in FIGS. 4 to 6. As described above, when the cover is on the closed side of the over center position, the cover is biased toward the closed position; when the cover is on the open side of the over center position, the cover is biased toward the open position.

In this embodiment, the cover 12 is biased toward the closed position substantially through the entire range of motion of the cover from the over center position to the closed position. In other embodiments, the cover 12 may be biased toward the closed position through only a portion of the range of motion of the cover from the over center position to the closed position.

In this embodiment, part of the cover 12 is "tucked" behind the hinge 83. The portion of the cover 12 which is adjacent to the contact end 18 of the cover 12 fits within the base 14. This reduces the phone length from the combined length of the base 14 and cover 12 by approximately two times the distance "X".

With a "tucked" hinge arrangement, the angled internal surface 53 can increase the stability of the cellular phone 10 when placed on a flat surface in the open position, which may enhance key interaction.

The locating of the over center mechanism in the input device assembly/base hinge enables miniaturisation of the cover/input device assembly hinge.

The lifting of the recessed input device assembly 62, and particularly the keypad 74, enables reduction of cosmetic gaps between the display 24 and the base 14/input device assembly 62 in the closed position.

Figure 7:
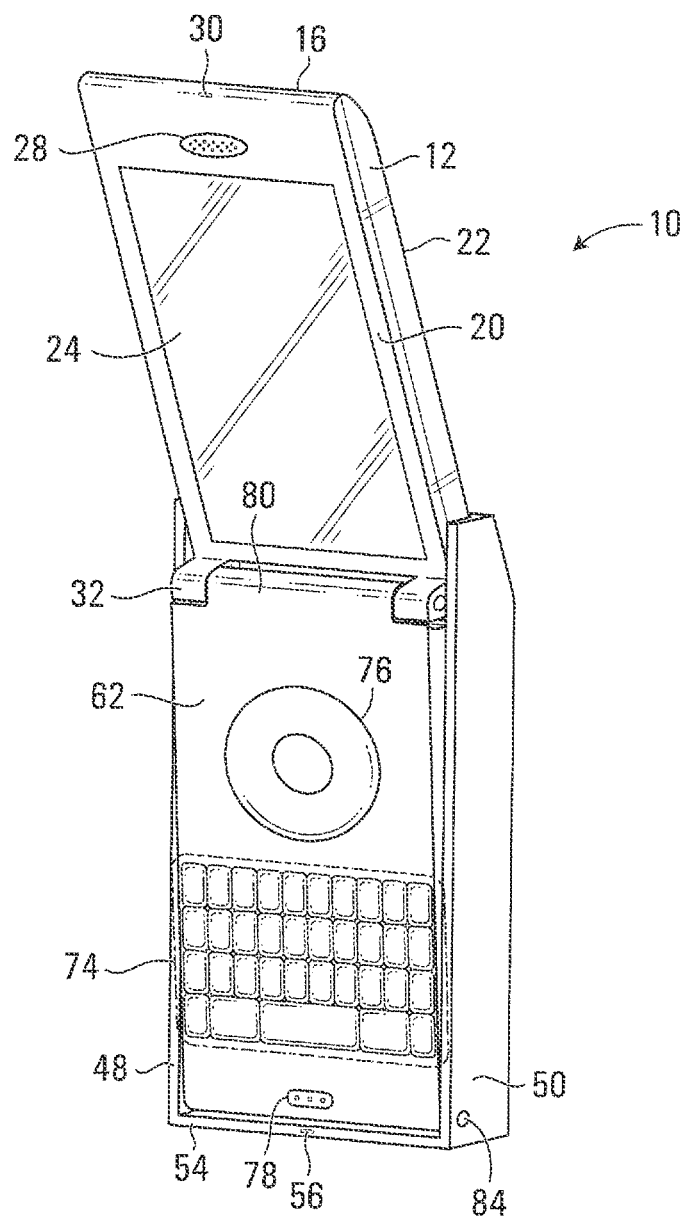
FIG. 7 is a perspective view of the cellular telephone of FIG. 2 in a fully open position.

FIG. 7 shows a perspective view of the cellular telephone 10 in the open position of FIG. 6. As can be seen from FIG. 7, in this embodiment, the input device assembly 62 is angled outwards from the base 14 so that the input device assembly 62 is more accessible. For example, the keys of the keypad 74, particularly those along the edges, are more accessible since they are lifted up past the side walls 48 and 50.

Additionally, the gap 88 (see FIGS. 5 and 6) may include, for example, a speaker opening which may provide enhanced amplification due to the acoustics provided by the gap.

Figure 8:
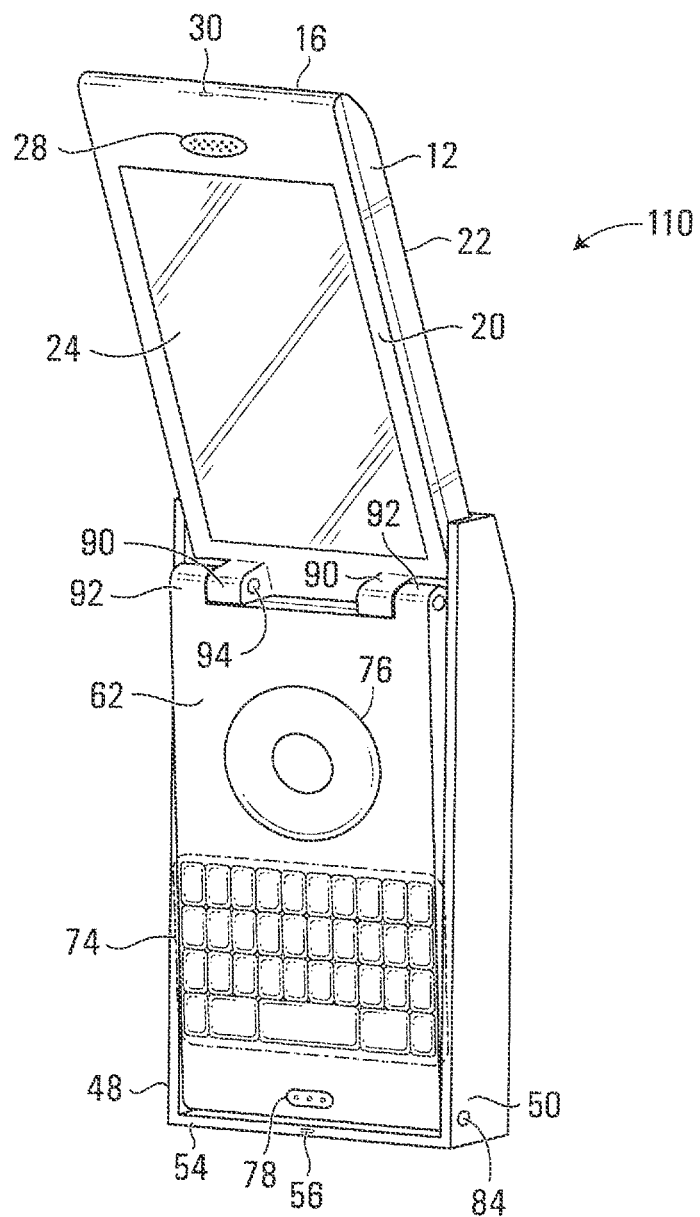
FIG. 8 is a perspective view of a cellular telephone according to a second embodiment in a fully open position.

FIG. 8 shows another embodiment of a cellular telephone 110 in the fully open position. FIG. 8 will be described to the extent that it differs from FIG. 7. In this embodiment, rather than having the second hinge arm 80 extending from the input device assembly 62 between the pair of first hinge arms 32 extending from the cover 12, there is a third pair of hinge arms 90 of the cover 12 which extend adjacent a fourth pair of hinge arms 92 of the input device assembly 62. The pairs of hinge arms 90 and 92 are connected by separate third hinge pins 94. In this embodiment, the fourth pair of hinge arms 92 are the outer most hinge arms and the third pair of hinge arms 90 are inside the fourth pair of hinge arms 92. Also, there is no hinge pin extending all the way across the inside face 20 of the cover 12. With smaller pairs of hinge arms 90 and 92, the display 24 could extend down between the pair of hinge arms 90 ending closer to the input device assembly 62.

Figure 9:
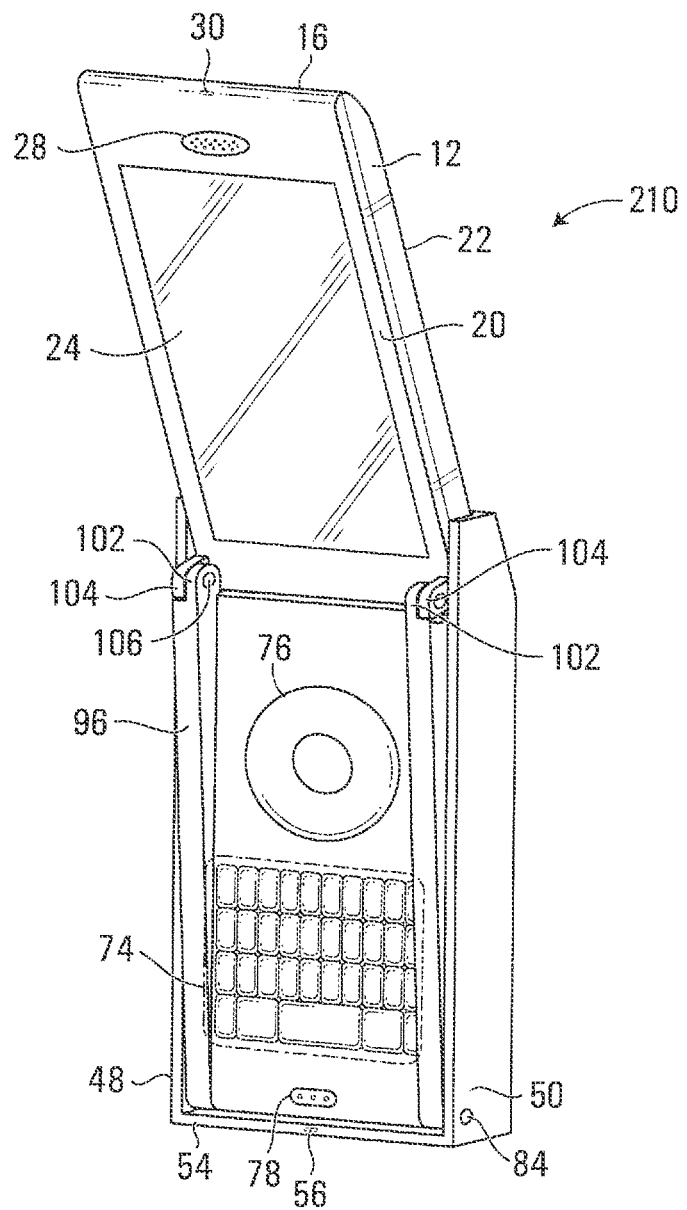
FIG. 9 is a perspective view of a cellular telephone according to a third embodiment in a fully open position.

Numerous other rotational interconnections are possible. For example, FIG. 9 depicts another embodiment of a cellular telephone 210. FIG. 9 will be described to the extent that it differs from FIG. 7. In this embodiment, the input device assembly 62 is not hinged to the base 14. Instead, the input device assembly 62 is permanently seated in the base 14. Two strips 96 extending along the sides of the input device assembly 62 are rotatably connected to the base 14. The strips 96 have fifth pairs of hinge arms 102 which are connected to sixth pairs of hinge arms 104 of the cover 12 by fourth hinge pins 106. It will be appreciated that in this embodiment, the strips 96 are biased towards the base 14 and the strips 96 are levered outward when the cellular telephone 210 is opened. This embodiment does not raise the input device assembly 62 relative to the base 14.

In some embodiments, the base 14 and cover 12 may be shaped such that there is contact between the contact end 18 of the cover and the inner face 46 of the base as soon as rotation of the cover 12 is commenced. In such embodiments, a latching system may be omitted.

Although a particular shape is shown of the profile of the cover 12, the input device assembly 62 and the base 14, it will be understood by the person skilled in the art that these profiles may be varied to other co-operation shapes.

Although a torsion spring is referred to in the description of the embodiments other types of biasing means may be used. For example, a linear spring may be provided in the gap 88 connecting the base side 70 of the input device assembly 62 and the inside face 46 of the base 14.

Other embodiments include other portable devices such as laptop computers and personal communication devices.

The depiction of a display screen on the cover and an input device assembly on the base is merely exemplary. It will be understood that the location of these elements may be reversed or these elements may be omitted, altered or be distributed over both portions. Similarly the location and presence of the speakers, the microphone and the latching mechanism may be varied or omitted depending on the type of the device and its use.

What has been described is merely illustrative of the application of the principles of the embodiments. Other arrangements and methods can be implemented by those skilled in the art without departing from the spirit and scope of the present application.

What is claimed is:

1. A portable electronic device comprising:
   a base;
   a cover rotatably mounted to the base;
   at least one intermediate member rotatably mounted to the cover at a first end and to the base at a second end; and
   a lever arrangement comprising a co-operating lever arm and a support defined by the base and the cover;
   wherein the cover is movable between a closed position and an open position through an over center position by movement of the lever arm against the support upon rotation of the cover; and
   wherein at least a portion of the cover fits between the base and the at least one intermediate member when the cover is in the open position, whereby the length of the device in the open position is shorter than a combined length of the cover and the base.

2. The portable electronic device of claim 1 further comprising a spring mechanism wherein the cover is biased by the spring mechanism toward the closed position when the cover is on a closed side of the over center position and toward the open position when the cover is on an open side of the over center position.

3. The portable electronic device of claim 1 wherein the at least one intermediate member is an input device assembly.

4. The portable electronic device of claim 3 wherein the cover is rotatably mounted to the input device assembly by at least one first hinge.

5. The portable electronic device of claim 4 wherein the input device assembly is movable relative to the base between a raised position when the cover is in the open position and a lowered position when the cover is in the closed position.

6. The portable electronic device of claim 5 wherein movement of the lever arm against the support upon opening the cover raises the input device assembly relative to the base.

7. The portable electronic device of claim 6 wherein the input device assembly is mounted to the base by a second hinge, and a spring mechanism acts on the hinge to bias the input device assembly to the lowered position.

8. The portable electronic device of claim 7 wherein the spring acts to bias the cover towards the open or the closed position.

9. The portable electronic device of claim 1 wherein the cover is mounted to the at least one intermediate member by a hinge, and a spring mechanism, remote from the hinge, biases the cover towards the open or the closed position.

10. The portable electronic device of claim 1 wherein the cover is rotatable about a hinge spaced inward from a contact end of the cover and the lever arm comprises the portion of the cover between the hinge and the contact end of the cover.

11. The portable electronic device of claim 6 wherein the cover supports the input device assembly in the raised position.

12. The portable electronic device of claim 6 further comprising a cavity between the base and the input device assembly in the raised position and a speaker opening in the cavity.

13. A portable electronic device comprising:
   an input device assembly;
   a base rotatably mounted to the input device assembly;
   a cover rotatably mounted to the input device assembly;
   a hinge configured for mounting the cover to the input device assembly, the hinge including at least one first hinge arm being spaced inward from a contact end of the cover, at least one second hinge arm extending from a cover end of the input device assembly, and a hinge pin configured for connecting said at least one first hinge arm to said at least one second hinge arm; and
   a lever arrangement comprising a co-operating lever arm and a support defined by the base and the cover;
   wherein the cover is movable between a closed position and an open position through an over center position by movement of the lever arm against the support upon rotation of the cover; and
   wherein a portion of the cover from the at least one first hinge arm to the contact end of the cover fits between the base and the input device assembly when the cover is in the open position, whereby the length of the device in the open position is shorter than a combined length of the cover and the base.

14. The portable electronic device of claim 13 further comprising an electrical conductor connected between the cover and the base wherein the electrical conductor is located between the hinge and the contact end.

15. The portable electronic device of claim 1 further comprising a closure at a free end of the cover for providing a closure force between the free end and the base.

16. The portable electronic device of claim 15 wherein the closure is magnetic.

17. The portable electronic device of claim 1 wherein the cover is biased toward the closed position through the range of motion of the cover from the over center position to the closed position.

18. The portable electronic device of claim 1 wherein the cover is biased toward the closed position through a portion of the range of motion of the cover from the over center position to the closed position.

19. A portable electronic device comprising:
a base;
a cover having a free end and a contact end;
an intermediate member;
a first hinge rotatably mounting the cover to the intermediate member;
a second hinge rotatably mounting the intermediate member to the base;
wherein the first hinge is spaced inward from the contact end; and
wherein at least a portion of the cover from the first hinge to the contact end fits between the base and the intermediate member when the cover is in an open position, whereby the length of the device in the open position is shorter than the combined length of the cover and the base.

20. The portable electronic device of claim 19 wherein the portion of the cover between the hinge and the end functions as a lever arm and the hinge acts as a fulcrum to move the cover between a closed position and the open position through an over center position by movement of the lever arm against the base upon rotation of the cover.

* * * * *